United States Patent [19]

Wirth

[11] Patent Number: 4,953,773

[45] Date of Patent: Sep. 4, 1990

[54] SKI CARRIER

[76] Inventor: John G. Wirth, R.D. #2, Box 140 F, Landenberg, Pa. 19350

[21] Appl. No.: 393,225

[22] Filed: Aug. 14, 1989

[51] Int. Cl.$^5$ .............................................. B60R 9/12
[52] U.S. Cl. ................................. 224/328; 224/42.01; 224/151; 224/316; 224/917; 294/147; 206/315.1; D12/157
[58] Field of Search ............... 224/151, 917, 202, 205, 224/231, 241, 242, 245, 251, 42.01, 316, 319, 328; 294/147, 149; 220/441, 22; 229/DIG. 2; 206/315.1; 211/70.5; 296/180.1, 37.7; D12/157

[56] References Cited

U.S. PATENT DOCUMENTS

| | | | |
|---|---|---|---|
| 2,434,826 | 1/1948 | Wubben | 224/29 |
| 3,515,263 | 6/1970 | Carlson | 206/16 |
| 3,921,871 | 11/1975 | Heil | 224/45 S |
| 3,946,892 | 3/1976 | Rigal et al. | 220/441 |
| 4,059,209 | 11/1977 | Grisel | 224/45 S |
| 4,084,735 | 4/1978 | Kappas | 224/917 |
| 4,402,355 | 9/1983 | Wymore et al. | 206/315.1 |
| 4,456,158 | 6/1984 | Wertz | 224/316 |
| 4,470,528 | 9/1984 | Dyess | 224/257 |
| 4,643,302 | 2/1987 | Baumgardner | 206/315.1 |
| 4,644,986 | 2/1987 | Fusaro | 150/52 R |
| 4,674,787 | 6/1987 | De Vera | 294/147 |
| 4,746,159 | 5/1988 | Webb | 294/147 |
| 4,785,980 | 11/1988 | Redick | 224/42.03 |

*Primary Examiner*—Linda J. Sholl
*Attorney, Agent, or Firm*—Connolly & Hutz

[57] ABSTRACT

A ski carrier is in the form of a generally rigid tube of arcuate cross-sectional shape. The tube is divided into a plurality of compartments so that the skis as well as other equipment such as the ski poles may be stored in individual compartments. The skis are mounted in their compartments in contact with the inner surface of the tube to assure that the bindings of the skis are spaced from the walls of the tubes. One end of the tube is openable for insertion and removal of the skis and other equipment.

31 Claims, 1 Drawing Sheet

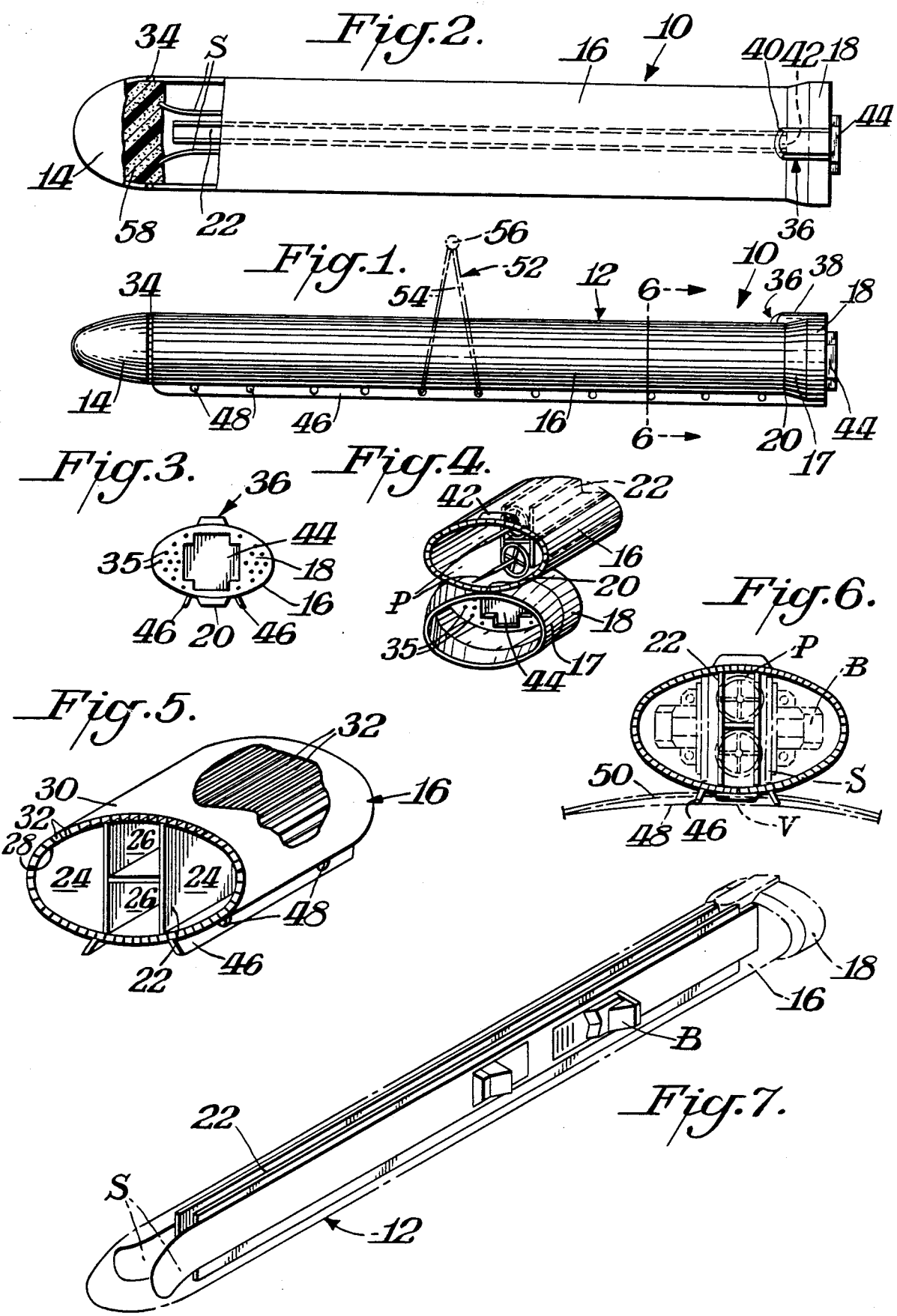

SKI CARRIER

BACKGROUND OF INVENTION

The ever high quality and price of fine skis and bindings have created the need for a protective container of the same caliber. Greater equipment expense has exacerbated the problem of travel related damage whether caused by road debris, salt corrosion or freezing rain while atop a rack or by airline baggage handling abuse. Unprotected skis are exposed to cosmetic injury and dangerous detuning of release settings. Most damage to skis is done not while in use, but while in transit. Various devices have been used to store and transport skis. These devices have included ski racks mounted to a vehicle where the skis are mounted in an exposed condition. Other devices have included bag like devices which may be carried by the user. It would be desirable if a ski carrier could be provided which maintains the skis in a protected manner to prevent, for example, damage to the bindings. It would also be desirable if a ski carrier could be provided which is capable of being mounted to a vehicle as well as capable of being carried by the user and is also capable of being stored in a convenient manner during periods of non-use. It would further be desirable if such a ski carrier could be aerodynamically shaped so as to minimize air resistance when the ski carrier is mounted to a vehicle.

Such an ideal ski carrier should minimize the inconvenience of cleanings of the equipment. The ideal ski carrier should also provide secure summer storage and be sufficiently light weight, strong and inexpensive.

SUMMARY OF INVENTION

An object of this invention is to provide a ski carrier which fulfills the above needs.

A further object of this invention is to provide such a ski carrier which is a convenient and secure container to transport skis and poles whether by airplane or automobile.

A still further object of this invention is to provide such a ski carrier which is lightweight, portable and physically appealing.

In accordance with this invention, the ski carrier is in the form of an aerodynamically shaped tube having sufficient rigidity to protect the skis. The tube is divided into a plurality of compartments so that the skis and other equipment, such as the ski poles, could be inserted into individual compartments. The tube is of such a size that the skis contact the wall of the tube and thereby maintain the bindings spaced from the wall to avoid damage to the bindings. One end of the tube is openable to permit ready insertion and removal of the skis and other equipment.

In a preferred practice of the invention, an inverted I-beam or H-shaped member extends substantially the entire length of the tube to thereby divide the carrier into four separate compartments. The front end or nose of the tube is generally bullet shaped so that the tube has an aerodynamic form. The rear end of the tube includes a hinged cap to provide access to the interior of the tube. In the preferred form of the invention, the hinged cap is locked in a closed position by an aerodynamically shaped heavy duty lock mechanism. The cap preferably includes support structure whereby the carrier may be mounted on the capped end in a vertical position during periods of non-use. A pair of runners may extend substantially the length of the tube to space the tube from whatever support surface the tube is placed upon. The runners add stability when the tube is mounted and provide a means for attachment of the carrier to, for example, a vehicle.

THE DRAWINGS

FIG. 1 is a side elevation view of a ski carrier in accordance with this invention;

FIG. 2 is a top plan view partly in section of the ski carrier shown in FIG. 1;

FIG. 3 is a rear elevation view of the ski carrier shown in FIGS. 1–2;

FIG. 4 is a perspective view of a portion of the ski carrier shown in FIGS. 1–3 with the cap in an open position;

FIG. 5 is a perspective view of a portion of the ski carrier shown in FIGS. 1–4 illustrating the internal structure thereof;

FIG. 6 is a cross-sectional view taken through FIG. 1 along the line 6—6; and

FIG. 7 is a perspective view showing a pair of skis mounted in the ski carrier of FIGS. 1–6.

DETAILED DESCRIPTION

The drawings illustrate a ski carrier 10 in accordance with this invention. As shown therein, carrier 10 is in the form of a tube 12 having a nose portion 14, a central main body portion 16 and a cap portion 18. Cap portion 18 terminates in inwardly tapered transition section 17. Nose portion 14 is generally bullet shaped to provide an aerodynamic form to the carrier 10. In general, the carrier is of oval cross-section as best shown in FIGS. 5–6. Nose 14 is permanently secured to body portion 16 in any suitable manner, such as by solvent sealing. Tapered section 17 is hinged to body portion 16 as illustrated in FIG. 4 by a portion of cap 18 being solvent sealed or secured in any other suitable manner to body portion 16 thereby having the joint portion comprise a hinge 20. Hinge 20 may be an internal rolling hinge such as found on a door.

An H-shaped member or inverted I-beam 22 is mounted within portion 16 and extends substantially the entire body length of body portion 16. In the preferred practice of the invention I-beam 22 terminates about six inches from the hinge 20 to permit access to the interior of body portion 16. As shown in FIG. 5, I-beam 22 thereby divides body 16 into four compartments 24,24 and 26,26. I-beam 22 may be made integral with body portion 16 by being extruded in the same operation as the extrusion of body portion 16 or may be a separate member inserted into body portion 16 and held in place in any suitable manner, including by means of the close dimensioning of I-beam 22 with respect to body portion 16. Body portion 16, I-beam 22, nose 14 and cap 18 are preferably made of a generally rigid material such as a polycarbonate or Lexan which would be UV safe, fracture proof and extrudable. Other possible materials include pvc.

As best shown in FIG. 5, body portion 16 is formed of two layer material comprising an inner wall 28 and an outer wall 30 separated by ribs 32 which extend longitudinally the entire length of body portion 16, thus being of corrugated construction. If desired, nose 14 and cap 18 may have similar construction. Preferably cap 18 is injection molded in one layer construction, while body portion 16 is extruded. The spaced longitudinal ribs 32 permit walls 28 and 30 to be made sufficiently thin so as to provide the necessary flexability for accommodating the skis and other equipment and yet be strong enough because of the strength and support added by the intermediate ribs 32. A further advantage of the two wall structure separated by ribs 32 is to provide ventilation channels between the spaced ribs. In this respect, there is a break in outer wall 32 at its area of connection 34 with nose 14 whereby area 34 provides an intake for air to enter the channels formed between spaced ribs 32 and the air would flow into cap 18 and exit through perforations 35 formed in the rear wall of cap 18. Thus, the structure of carrier 10 is such as to provide a convection temperature control system which is particularly important when carrier 10 is mounted on a vehicle during transportation.

As previously noted, cap 18 is hingedly connected by hinge section 20 at transition section 17. This permits access to the interior of body portion 16 for the loading or unloading of the ski equipment. Cap 18 and body or tube 16 also include a heavy duty locking structure 36 to maintain the cap locked during conditions of use. The locking structure may take any suitable form, but preferably includes an aerodynamically shaped lock housing 38 having an inclined lead end provided by the inclined surface 40. As illustrated lock housing 38 is mounted to portion 16. Cap 18 includes a lock plate 42 which would be inserted into housing 38 and locked therein by means of the springiness of lock plate 42. The cap could be opened by depressing lock plate 42. The specific locking mechanism is not critical to the practice of the invention and other arrangements could be used including arrangements based upon the same locking principle as is used, for example, in the locking of one end of the wrist watch band to the other end. The locking structure should be sufficiently heavy duty to avoid accidental unlocking.

A further feature of this invention is the inclusion of a rigid mounting platform 44 to the external surface of cap 18. Mounting platform 44 provides support for carrier 10 when carrier 10 is stored in a vertical position during periods of non-use by standing carrier 10 on its end with mounting plate 44 being disposed on the support surface such as a floor. The provision of a separate support surface is particularly desirable to assure that tube 12 would be spaced above the support surface and thereby avoid any scratching to, for example, the bottom of cap 18.

Another advantageous feature of the invention is the provision of a pair of runners 46 which extend the entire length of body portion 16 but not beyond hinge 20 so as not to interfere with the opening of cap 18 at least 180°. Lock 36 is diametrically opposite hinge 20. Runners 46 are preferably integrally formed or extruded with body portion 16. As best shown in FIG. 1, runners 46 include a plurality of spaced holes 48 located along the length of runners 46. Runners 46 function to space body portion 16 above a support surface and thereby avoid any scratching or damage to body portion 16. This is particularly important where body portion 16 includes logos, advertising information or other decorative designs. A further advantage of runners 46 is that the holes 48 may be used to attach carrier 10 to, for example, a vehicle V. Thus, as shown in phantom in FIG. 6, a cord or other tie device 50 may be inserted through aligned holes 48 for attaching carrier 10 to a ski rack or to other mounting brackets on vehicle V.

If desired, body portion 16 may be provided with suction cups as a means of attachment to a vehicle. The use of suction cups is not the preferred practice of the invention since it may detract from the high cosmetic exterior of carrier 10.

Another alternative which permits carrier 10 to be easily carried by a user is to provide carrying straps which may be used as a handle or shoulder straps. Such carrier straps could, for example, be simply tension straps mounted around tube 16 at spaced locations and then used as handles or shoulder straps. FIG. 1, for example, shows in phantom a strap 52 which is mounted to carrier 10 by means of individual strap members 54 being inserted through spaced sets of holes 48 and joined together at their upper end to form a handle portion 56 which may be carried by the user.

In use, cap 18 would be opened as shown in FIG. 4 to expose the interior of body portion 16. The individual skis S,S would then be inserted into individual compartments 24,24. Body portion 16 is dimensioned so that the skis touch inner layer or wall 28 at the tallest portion of compartments 24,24 (see FIG. 6). The natural flex or side camber of the skis thus holds the skis S,S in place in compartments 24,24 with the bindings B spaced from the wall of body portion 16, thus preventing any damage to the bindings. Other equipment, such as ski poles P would be inserted into compartments 26,26. Cap 18 would then be closed and carrier 10 could be mounted on a vehicle V with runners 46 resting on the vehicle to provide stability for carrier 10. Alternatively, carrier 10 could be manually carried by either holding the carrier 10 directly or through the use of a shoulder strap or of a handle such as handle 52. Alternatively, carrier 10 could be stored on end by means of mounting platform 44.

If desired, individual carriers may be made of lengths corresponding to the common lengths of skis. In the preferred practice of the invention, however, carrier 10 is made of a length corresponding to the longest size ski so that the same carrier could be marketed for all users. For example, the longest ski is about seven feet long, thus carrier 10 would be made long enough to accommodate skis of that length. In the preferred practice of the invention body member 16 has an oval shape with the long diameter being 12 inches and the short diameter being 7 inches. Where carrier 10 is used for smaller length skis, the invention provides for the insertion of filler blocks 58 as shown in FIG. 2 which would be inserted in the nose 14 and extend sufficiently into body portion 16 to provide an abutment for the ski in accordance with the length of the ski. Filler block 58 could thus be provided of various lengths so that the appropriate length could be selected to thereby alter the effective length of the compartments in carrier 10 to conform to the length of the skis for each particular user. If desired, filler blocks 58 are removable so that carrier 10 could selectively accommodate longer or shorter skis. The removal may take place in any suitable manner. For example, an extraction tool having a cork screw type head could be inserted into carrier 10 and manipulated to anchor into filler block 58 and thereby permit its extraction. It is to be understood that a separate filler block would be used for each compartment 24,24 and 26,26. Filler block 58 would be made of any suitable material such as styrofoam.

Carrier 10 thus provides a number of distinct advantages. Carrier 10 is aerodynamically shaped by having a bullet type shaped nose 14 and an oval shaped body member 16 which terminates in an outwardly tapered transition section 17 joined to tubular cap 18 with a tapered lock housing 38. A further significant feature of the invention is the double walled structure separated by supporting ribs. This structure additionally provides a means of ventilation for carrier 10. The one piece structure is also very aesthetic while lending itself to low cost manufacturing. The provision of internal compartments simplifies the loading operation and minimizes any risk of damage to the equipment. The loading and unloading operations is easily accomplished by means of the hinged cap 18. Runners 46 not only provide a means for stable mounting of carrier 10 while spacing it from a support platform but also provide means whereby the carrier may be converted from being vehicle mounted to hand carried.

Simplicity of operation is an important feature of carrier 10. Skis are inserted at the back of tube 12 after the cap 18 is opened. As the skis slide into place their inherent spring tension or side camber holds the bindings away from contact with the inside of tube 12. Release settings are therefore undisturbed and knocking about is prevented. Each ski has its own compartment 24 so that fillers 58 can be introduced to accommodate different ski lengths.

The rear cap 18 is secured by (1) an internal rolling hinge 20 such a found on a door and (2) a heavy duty lockable latch 36. The carrier 10 is secured to roof racks by means of the perforated runners 46 which are universally adaptable. A detachable handle/strap may be included for portability.

The double walled, I-beam construction provides tremendous structural strength. Material is lightweight polycarbonate throughout.

While utilitarian in its ability to protect skis worth hundreds of dollars, the carrier 10 possesses superb cosmetics from its sleek aerodynamic shape to its high gloss, logoed surface.

What is claimed is:

1. A ski carrier in combination with two skis, said ski carrier comprising a generally rigid tube having a front nose and a rear cap interconnected by a body portion, a divider in said body portion dividing said body portion into a plurality of individual compartments, said cap being connected to said body portion by connecting means whereby said cap is selectively movable to an open position which provides access to said compartments and to a closed position which closes said compartments, locking means for selectively maintaining said cap in said closed position, said compartments including a pair of side compartments each of which is dimensioned to snugly hold an individual ski therein with the binding of the ski spaced from the wall of said body portion, and each of said skis being in a separate one of said compartments.

2. The carrier of claim 1 wherein said divider is I-beam to form four individual compartments.

3. The carrier of claim 2 wherein said divider terminates in said body portion inwardly of said cap to facilitate access to said compartments when said cap is in said open position.

4. The carrier of claim 3 wherein said divider terminates generally at the location where said nose is connected to said body portion.

5. The carrier of claim 2 wherein fillers are in said nose and extend into said compartments to reduce the effective length of said compartments.

6. The carrier of claim 1 wherein said body portion is of double walled construction separated by longitudinal ribs which form ventilation channels between said ribs, air intakes communicating with said channels, and exhaust vents communicating with said channels.

7. The carrier of claim 6 wherein said channels are exposed through the outer wall of said double wall construction at the location of said nose being connected to said body portion to comprise said air intakes, and said channels being exposed at the rear face of said cap to comprise said exhaust vents.

8. The carrier of claim 1 including a mounting platform mounted to said cap externally of said tube and perpendicular to the longitudinal axis of said tube to adapt said tube to stand on end with said mounting platform supporting said tube.

9. The carrier of claim 1 wherein a portion of said cap is integrally sealed to said body portion to form a hinge which comprises said connecting means.

10. The carrier of claim 9 wherein said locking means includes a locking housing mounted to said body section diametrically opposite said hinge, and said housing having a downwardly tapered front face whereby said housing is aerodynamically shaped.

11. The carrier of claim 1 wherein said tube is aerodynamically shaped with an oval cross sectional shape, said nose being bullet shaped, said cap terminating in an inwardly tapered transition section which terminates in the same size and shape as and is juxtaposed to said body portion, said locking means including a locking housing on said body portion, and said locking housing having a tapered front face.

12. The carrier of claim 1 including a pair of runners secured to said body portion parallel to each other at the lower surface of said body portion to support said tube when said tube is mounted on a support surface and to maintain said tube spaced from the support surface.

13. The carrier of claim 12 wherein a plurality of spaced holes extends through each of said runners.

14. The carrier of claim 13 wherein said holes in one of said runners are aligned with corresponding holes in the other runner.

15. The carrier of claim 13 wherein said runners extend along substantially the entire length of said body portion.

16. The carrier of claim 13 including mounting straps detachably inserted through selected spaced holes of said holes in said runners.

17. The carrier of claim 16 wherein said mounting straps are part of a carrying handle.

18. The carrier of claim 16 wherein said mounting straps are vehicle mounting straps.

19. The carrier of claim 2 wherein said tube and said divider are integrally extruded from plastic material.

20. The carrier of claim 2, in combination therewith, two poles, said compartments including a top compartment and a bottom compartment, and each of said poles being in one of said respective top compartment and bottom compartment.

21. A ski carrier comprising a generally rigid tube having a front nose and a rear cap interconnected by a body portion, said cap being connected to said body portion by connecting means whereby said cap is selectively movable to an open position which provides access to the interior of said body portion and to a closed position which closes said access, locking means for selectively maintaining said cap in said closed position, said body portion being dimensioned to snugly hold individual skis therein with the bindings of the skis spaced from the wall of said body portions said body portion being of double walled construction separated by longitudinal ribs which form ventilation channels between said ribs, air intakes communicating with said channels, exhaust vents communicating with said channels, said channels being exposed through the outer wall of said double wall construction at the location of said nose being connected to said body portion to comprise said air intakes, and said channels being exposed at the rear face of said cap to comprise said exhaust vents.

22. A ski carrier comprising a generally rigid tube having a front nose and a rear cap interconnected by a body portion, said tube being aerodynamically shaped with said rear cap and said body portion having an oval cross section and with said front nose being bullet shaped, said cap being connected to said body portion by connecting means whereby said cap is selectively movable to an open position which provides access to the interior of said body portion and to a closed position which closes said access, locking means for selectively maintaining said cap in said closed position, said body portion being dimensioned to snugly hold individual skis therein with the bindings of the skis spaced from the wall of said body portion, and a pair of longitudinal runners secured to said body portion parallel to each other at the lower surface of said body portion to support said tube when said tube is mounted on a support surface and to maintain said tube spaced from the support surface and to minimize wind resistance.

23. The carrier of claim 22 including a mounting platform mounted to said cap externally of said tube and perpendicular to the longitudinal axis of said tube to adapt said tube to stand on end with said mounting platform supporting said tube.

24. The carrier of claim 22 wherein a portion of said cap is integrally sealed to said body portion to form a hinge which comprises said connecting means.

25. The carrier of claim 24 wherein said locking means includes a locking housing mounted to said body section diametrically opposite said hinge, and said housing having a downwardly tapered front face whereby said housing is aerodynamically shaped.

26. The carrier of claim 25 wherein said cap terminates in an inwardly tapered transition section which terminates in the same size and shape and is juxtaposed to said body portion, said locking means including a locking housing on said body portion, and said locking housing having a tapered front face.

27. The carrier of claim 22 wherein said runners are of plate-like construction, and a plurality of spaced holes extending through each of said runners.

28. The carrier of claim 27 wherein said holes in one of said runners are aligned with corresponding holes in the other runner.

29. The carrier of claim 27 including mounting straps detachably inserted through selected spaced holes of said holes in said runners.

30. The carrier of claim 29 wherein said mounting straps are part of a carrying handle.

31. The carrier of claim 29 wherein said mounting straps are vehicle mounting straps.

* * * * *